United States Patent
Zhu et al.

(10) Patent No.: US 11,612,167 B2
(45) Date of Patent: Mar. 28, 2023

(54) **SHRIMP SHELL SEPARATION AND CLEANING DEVICE FOR *EUPHAUSIA SUPERBA***

(71) Applicant: Shandong University of Technology, Shandong (CN)

(72) Inventors: Lanlan Zhu, Shandong (CN); Jiahuan Li, Shandong (CN); Xiuting Wei, Shandong (CN); Zongmin Wang, Shandong (CN)

(73) Assignee: Shandong University of Technology, Shandong (CN)

( * ) Notice: Subject to any disclaimer, the term of this patent is extended or adjusted under 35 U.S.C. 154(b) by 7 days.

(21) Appl. No.: 17/487,860

(22) Filed: Sep. 28, 2021

(65) Prior Publication Data
US 2022/0095635 A1    Mar. 31, 2022

(30) Foreign Application Priority Data

Sep. 29, 2020 (CN) .......................... 202011050116.8

(51) Int. Cl.
*A22C 29/00*    (2006.01)
*A22C 29/02*    (2006.01)

(52) U.S. Cl.
CPC .......... *A22C 29/021* (2013.01); *A22C 29/026* (2013.01)

(58) Field of Classification Search
CPC .............................. A22C 29/021; A22C 29/026
(Continued)

(56) References Cited

U.S. PATENT DOCUMENTS 3,787,928 A * 1/1974 Domecki ............. A22C 29/021
                                              452/3
5,195,921 A * 3/1993 Ledet .................. A22C 29/028
                                              452/2
(Continued)

FOREIGN PATENT DOCUMENTS

CN    105746672 A    7/2016
CN    206101462 U    4/2017
(Continued)

OTHER PUBLICATIONS

First Office Action issued for priority application No. CN 202011050116.8 dated Aug. 11, 2021.
First search of priority application No. CN 202011050116.8.

*Primary Examiner* — Richard T Price, Jr.
(74) *Attorney, Agent, or Firm* — IP & T Group LLP

(57) ABSTRACT

A shrimp shell separation and cleaning device for *Euphausia superba* comprises a hollow main body; a screening cylinder installed rotationally inside the main body and having a bottom installed with a filter screen; a stirring assembly provided rotationally inside the main body and comprising a cylindrical cam installed inside the screening cylinder, wherein a sleeve frame is sleeved over the cylindrical cam, stirring rods are provided on the sleeve frame in an array mode and rotationally installed on the sleeve frame through driving grooves, the driving grooves run through the sleeve frame and each have one end, which penetrates through the sleeve frame, rotationally installed in one driving groove of the cylindrical cam, and the sleeve frame is arranged in self-rotating manner; a feeding port installed fixedly on communicating with the main body; and a spray head arranged fixedly inside the main body for spraying water into the screening cylinder.

10 Claims, 2 Drawing Sheets

(58) Field of Classification Search
USPC .............................................................. 452/2
See application file for complete search history.

(56) References Cited

U.S. PATENT DOCUMENTS

2005/0186893 A1    8/2005  Hulin
2022/0095635 A1*  3/2022  Zhu ...................... A22C 29/021

FOREIGN PATENT DOCUMENTS

| CN | 107006590 A | 8/2017 |
| CN | 108522629 A | 9/2018 |

* cited by examiner

SHRIMP SHELL SEPARATION AND CLEANING DEVICE FOR *EUPHAUSIA SUPERBA*

CROSS-REFERENCE TO RELATED APPLICATIONS

This application claims the priority of the Chinese patent application No. 202011050116.8 filed on Sep. 29, 2020 and entitled "Shrimp Shell Separation and Cleaning Device for *Euphausia Superba*", the contents of which are incorporated herein by reference as a part of the application.

TECHNICAL FIELD

The present disclosure relates to the technical field of *Euphausia superba* processing, in particular to a shrimp shell separation and cleaning device for *Euphausia superba* (Antarctic krill).

BACKGROUND ART

*Euphausia superba* belongs to the krill family and krill genus shrimp. Adult shrimps are 45-60 mm long, with the largest being 90 mm long. Its carapace portion is connected to the shell. Due to that the carapace at two sides of the shell is small and short, the gills of *Euphausia superba* are visible to the naked eye. Its feet do not form jaw feet, which is different from other decapods. *Euphausia superba* has biological fluorescent organs that can produce light.

During the production process of *Euphausia superba*, the shrimp shell need to be separated from the shrimp, but the prior art has a phenomenon of incomplete separation during the separation process, and the separation effect is not good. Therefore, a shrimp shell separation and cleaning device for *Euphausia superba* is provided to solve this technical problem.

SUMMARY

The purpose of the present disclosure is to provide a shrimp shell separation and cleaning device for *Euphausia superba* to solve the above-mentioned problems in the background technology.

In order to achieve the above purpose, the present disclosure provides the following technical solutions:

a shrimp shell separation and cleaning device for *Euphausia superba*, comprising a main body, wherein the interior of the main body is provided to be hollow;

a screening cylinder, installed rotationally inside the main body, wherein a filter screen is installed at the bottom of the screening cylinder;

a stirring assembly, provided rotationally inside the main body, wherein the stirring assembly comprises a cylindrical cam installed inside the screening cylinder, a sleeve frame is rotationally sleeved over the outer side of the cylindrical cam, and a plurality of stirring rods are provided on the sleeve frame in an array mode, and the plurality of stirring rods are rotationally installed on the sleeve frame through driving grooves, the driving grooves are provided in such a way that the driving grooves run through the sleeve frame and each have the end, which penetrates through the sleeve frame, rotationally installed in one of the driving grooves on the cylindrical cam; and the sleeve frame is arranged in self-rotating manner;

a feeding port, installed fixedly on the main body and communicating with the interior of the main body; and a spray head, arranged fixedly inside the main body and configured for spraying water into the interior of the screening cylinder.

As a further solution of the present disclosure: the spray head is externally connected with a high-pressure water source.

As a still further solution of the present disclosure: the upper end of the screening cylinder is provided with an opening.

As a still further solution of the present disclosure: a material guide section is provided at the opening, the screening cylinder is arranged in a self-rotating manner; and the interior of the main body is further provided with a material guide plate, and the bottom of the material guide plate is provided with a shrimp discharge port, wherein the shrimp discharge port is installed on the side wall, and the material guide plate is provided below the bottom of the screening cylinder.

As a still further solution of the present disclosure: one end of the cylindrical cam is fixedly installed with a support shaft, and the support shaft is rotationally or fixedly installed on the side wall of the screening cylinder; one end of the sleeve frame away from the support shaft is fixedly installed with a first rotating shaft, and the first rotating shaft is provided such that the first rotating shaft penetrates through the side wall of the screening cylinder and is installed on the main body in a self-rotating manner.

As a still further solution of the present disclosure: the main body is further provided with a third motor that is in transmission connection with the first rotating shaft.

As a still further solution of the present disclosure: the outer side of one of the side walls of the screening cylinder is fixedly installed with a second rotating shaft, and the second rotating shaft is provided such that the second rotating shaft penetrates through the side wall of the main body, the second rotating shaft is rotationally installed on the main body, wherein the second rotating shaft and the first rotating shaft are provided on two sides; and the main body is provided with a first motor that is transmission connection with the second rotating shaft.

As a still further solution of the present disclosure: the output end of the first motor is provided with a first gear, and the first gear meshes with a fourth gear fixedly installed on the second rotating shaft.

As a still further solution of the present disclosure: a plurality of self-rotating third rotating shafts are provided at the bottom of the screening cylinder, and brushes are provided on the third rotating shafts.

As a still further solution of the present disclosure: the main body is further provided with a plurality of second motors that are in transmission connection with the plurality of third rotating shafts.

Compared with the prior art, the present disclosure has the beneficial effects that: the shrimps to be separated are added into the interior of the screening cylinder through the feeding port, the stirring assembly rotates, and the sleeve frame rotates to drive the plurality of stirring rods to rotate, wherein the driving grooves of the stirring rods slide in the driving grooves of the cylindrical cam, and the stirring rods swing back and forth during the stirring process under the driving of the driving grooves, thereby increasing the diversity of stirring for the shrimps and accelerating the separation between the shrimps and the shells, and at the same time, the spray head sprays water into interior of the screening cylinder, to clean the shrimps to further accelerate the separation between the shrimps and the shells; and the separated shells are discharged from the filter screen. The present disclosure increases the stirring diversity of the stirring rods by arranging the cylindrical cam and the sleeve frame, and improves the separation effect of the shrimps and the shells, and also further improves the separation effect by spraying water.

Figure 1:
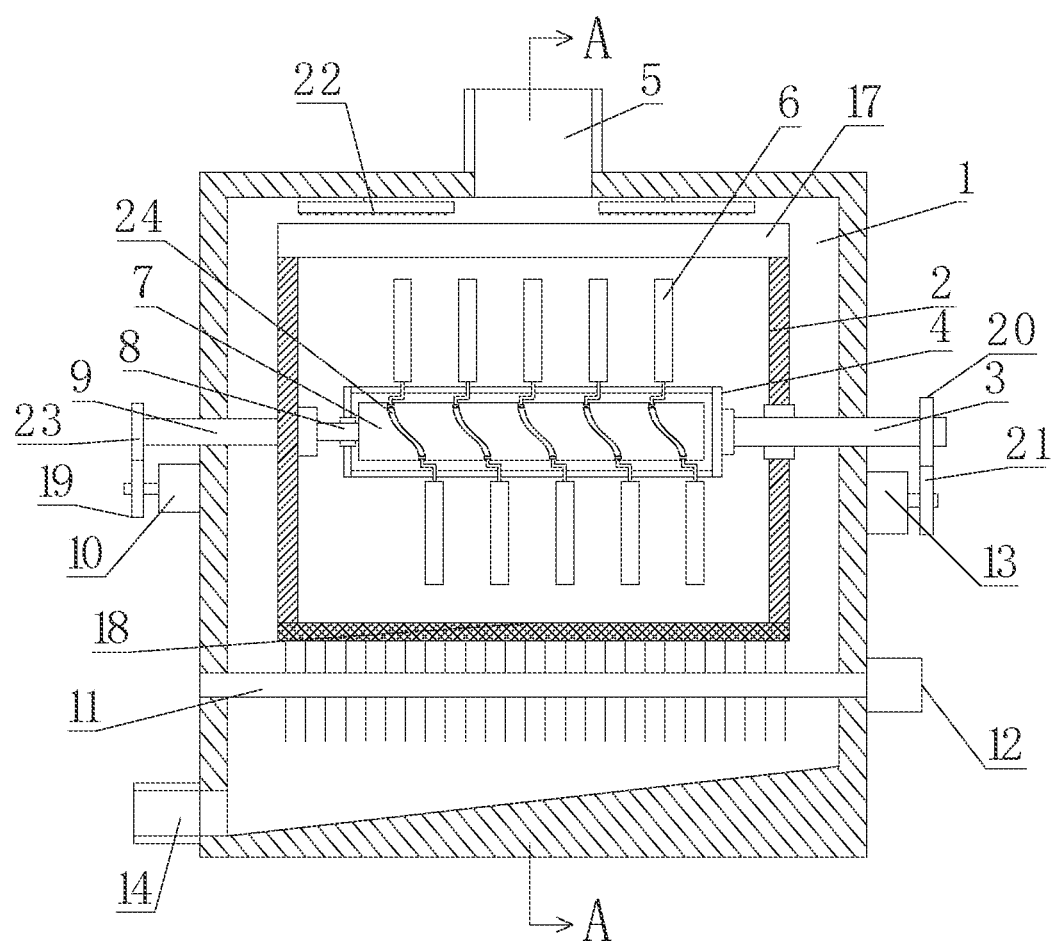
FIG. 1 is a structural schematic view of a shrimp shell separation and cleaning device for *Euphausia superba*.

In the drawing: main body—1; screening cylinder—2; first rotating shaft—3; sleeve frame—4; feeding port—5; stirring rod—6; cylindrical cam—7; support shaft—8; second rotating shaft—9; first motor—10; third rotating shaft—11; second motor—12; third motor—13; slag discharge port—14: shrimp discharge port—15; material guide plate—16; material guide section—17; filter screen—18; first gear—19; second gear—20; third gear—21; spray head—22; fourth gear—23; driving groove—24.

DETAILED DESCRIPTION OF EMBODIMENTS

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those ordinary skilled in the art without creative work shall fall within the protection scope of the present disclosure.

Figure 2:
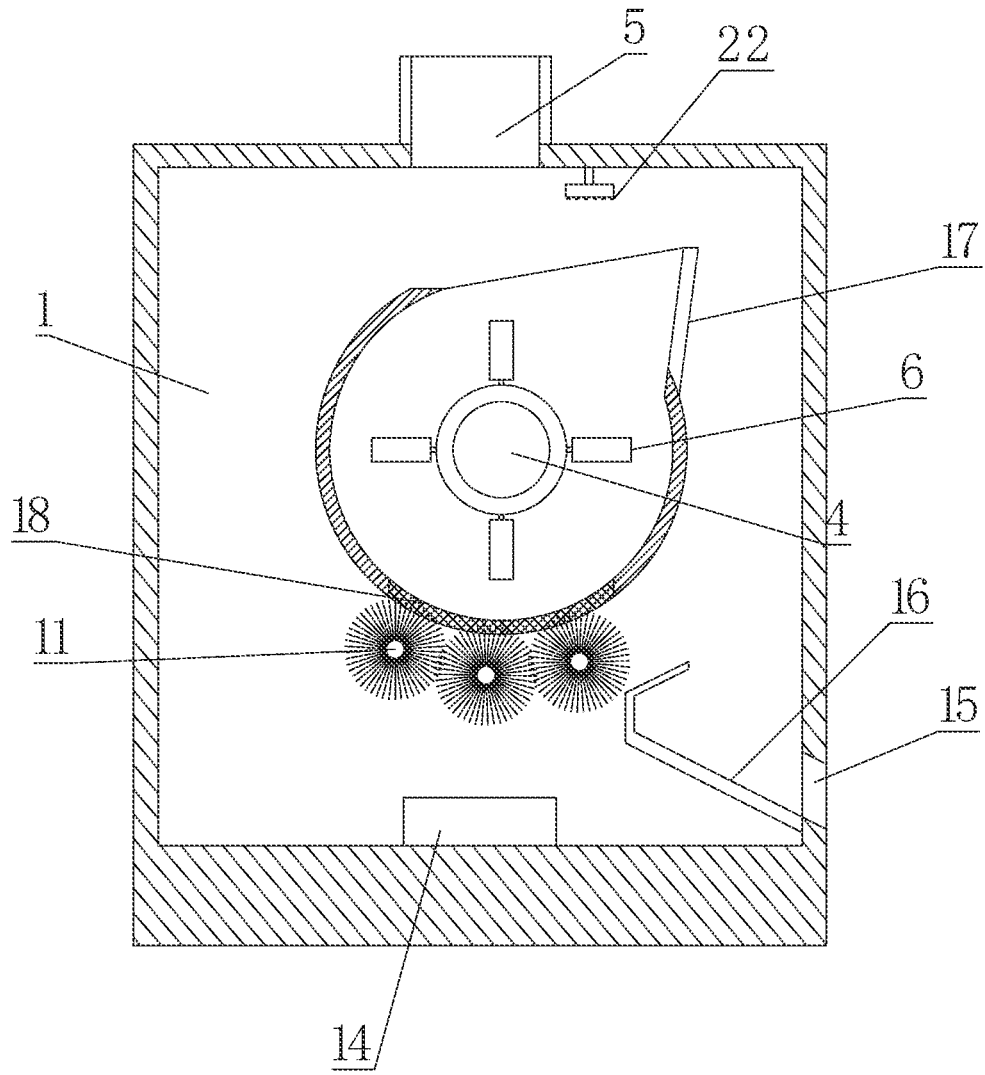
FIG. 2 is a view from direction of A-A in FIG. 1.
Figure 3:
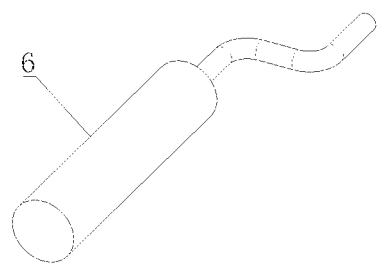
FIG. 3 is a structural schematic view of a stirring rod in the shrimp shell separation and cleaning device for *Euphausia superba*.

As shown in FIG. 1-FIG. 3, it is a structural view of a shrimp shell separation and cleaning device for *Euphausia superba* provided by an embodiment of the present disclosure, comprising a main body 1, having the interior provided to be hollow;

a screening cylinder 2, installed rotationally inside the main body 1, and having a bottom installed with a filter screen 18;

a stirring assembly, provided rotationally inside the main body 1, wherein the stirring assembly comprises a cylindrical cam 7 installed inside the screening cylinder 2, a sleeve frame 4 is sleeved over the outer side of the cylindrical cam 7, and a plurality of stirring rods 6 are provided on the sleeve frame 4 in an array mode, and the plurality of stirring rods 6 are rotationally installed on the sleeve frame 4 through driving grooves 24, the driving grooves 24 are provided in such a way that the driving grooves run through the sleeve frame 4 and each have the end, which penetrates through the sleeve frame 4, rotationally installed in one of the driving grooves on the cylindrical cam 7; and the sleeve frame 4 is arranged in self-rotating manner;

a feeding port 5, installed fixedly on the main body 1 and communicating with the interior of the main body 1; and a spray head 22, arranged fixedly inside the main body 1 and configured for spraying water into the interior of the screening cylinder 2, so as to accelerate the separation between the shrimps and the shells.

In the embodiment of the present disclosure, the shrimps needing to be separated are added into the interior of the screening cylinder 2 through the feeding port 5, the stirring assembly rotates, and the sleeve frame 4 rotates to drive the plurality of stirring rods 6 to rotate, wherein the driving grooves 24 on the stirring rods 6 slide in the driving grooves 24 on the cylindrical cam 7, and the stirring rods 6 swing back and forth during the stirring process under the driving of the driving grooves 24, thereby increasing the diversity of stirring for the shrimps and accelerating the separation between the shrimps and the shells, and also the spray head 22 sprays water into interior of the screening cylinder 2, to clean the shrimps, further accelerating the separation between the shrimps and the shells; and the separated shells are discharged through the filter screen 18. The present disclosure increases the stirring diversity of the stirring rods 6 by arranging the cylindrical cam 7 and the sleeve frame 4, and improves the separation effect of the shrimps and the shells, and also further improves the separation effect by spraying water.

The spray head 22 is externally connected with a high-pressure water source to provide the water source for the spray head on the spray head 22.

As a preferred embodiment of the present disclosure, in order to facilitate adding shrimps to the interior of the screening cylinder2, an opening is provided at the upper end of the screening cylinder 2.

In order to discharge the separated shrimps in the screening cylinder 2, a material guide section 17 is provided at the opening, the screening cylinder 2 is arranged in a self-rotating manner; and the interior of the main body 1 is also provided with a material guide plate 16, and the bottom of the material guide plate 16 is provided with a shrimp discharge port 15, wherein the shrimp discharge port 15 is installed on the side wall of the main body 1, and the material guide plate 16 is provided below the bottom of the screening cylinder 2. Specifically, when separation of the shrimps inside the screening cylinder 2 is completed and the screening cylinder 2 rotates until the opening moves through the rotation to the bottom, the shrimps are poured to the material guide plate 16 through the material guide section 17, and then discharged through the shrimp discharge port 15, thereby realizing automatic discharge. This type of material discharging method meets the requirements of the discharging after the shrimps are completely separated, and avoids the oblique arrangement of the screening cylinder 2 in the prior art, due to which the shrimps are allowed to be discharged by themselves under the action of gravity and further there may be a phenomenon that the shrimps are discharged without being separated.

In order to drive the stirring assembly to rotate, one end of the cylindrical cam 7 is fixedly installed with a support shaft 8, and the support shaft 8 is rotationally or fixedly installed on the side wall of the screening cylinder 2; one end of the sleeve frame 4 away from the support shaft 8 is fixedly installed with a first rotating shaft 3, and the first rotating shaft 3 is provided such that the first rotating shaft penetrates through the side wall of the screening cylinder 2 and installed on the main body 1 in a self-rotating manner. Specifically, the first rotating shaft 3 rotates to drive the sleeve frame 4 to rotate, thereby providing power for the rotation of the stirring rods 6.

The main body 1 is further provided with a third motor 13 that is in transmission connection with the first rotating shaft 3. Specifically, the output end of the third motor 13 is provided with a third gear 21, the third gear 21 meshes with the second gear 20 fixedly sleeved over the first rotating shaft 3; the third motor 13 is energized to rotate, and drives the first rotating shaft 3 to rotate through the third gear 21 and the second gear 20, to provide power for the first rotating shaft 3 to rotate.

In order to provide power for the rotating and discharging of the screening cylinder 2, the outer side of one of the side walls of the screening cylinder 2 is fixedly installed with a second rotating shaft 9, and the second rotating shaft 9 is provided such that the second rotating shaft penetrates through the side wall of the main body 1, the second rotating shaft 9 is rotationally installed on the main body 1, wherein the second rotating shaft 9 and the first rotating shaft 3 are provided on two sides; the main body 1 is provided with the first motor 10 that is transmission connection with the second rotating shaft 9, the first motor 10 is energized to drive the second rotating shaft 9 to rotate, thereby providing power for the rotation of the screening cylinder 2.

Specifically, the output end of the first motor 10 is provided with a first gear 19, and the first gear 19 meshes with a fourth gear 23 fixedly installed on the second rotating shaft 9, the first motor 10 is energized to rotate, and drives the second rotating shaft 9 to rotate through the first gear 19 and the fourth gear 23, thereby providing power for discharging of the screening cylinder 2.

In order to avoid clogging of filter screen 18, a plurality of self-rotating third rotating shafts 11 are provided at the bottom of the screening cylinder 2, and brushes are provided on the third rotating shafts 11, the brushes clean the filter screen 18 to avoid clogging of the filter screen 18 and accelerate the separation between the shrimps and the shells.

The main body 1 is further provided with a plurality of second motors 12 that are in transmission connection with the plurality of third rotating shafts 11, and this arrangement provides power for the rotation of the third rotating shaft 11.

The bottom of the main body 1 is also provided with a slag discharge port 14 for discharging shrimp shells.

The working principle of the present disclosure comprises: the shrimps needing to be separated are added into the interior of the screening cylinder 2 through the feeding port 5, the third motor 13 is energized to rotate, to drive the first rotating shaft 3 through the third gear 21 and the second gear 20 to rotate, and the first rotating shaft 3 drives the sleeve frame 4 to rotate, and the sleeve frame 4 rotates to drive multiple stirring rods 6 to rotate, wherein the driving grooves 24 on the stirring rods 6 slide in the driving grooves 24 on the cylindrical cam 7, and the stirring rods 6 swing back and forth during the stirring process under the driving of the driving grooves 24, thereby increasing the diversity of stirring for the shrimps and accelerating the separation between the shrimps and the shells, and also the spray head 22 sprays water into interior of the screening cylinder 2, to clean the shrimps to further accelerate the separation between the shrimps and the shells; and the separated shells are discharged through the filter screen 18; and also the second motor 12 drives the third rotating shaft 11 to rotate to clean the bottom of the filter screen 18 to prevent filter screen 18 from clogging and accelerate the separation between the shrimps and the shells; the separated shells are discharged through the slag discharge port 14, when the separation are completed, the first motor 10 rotates, to drive the screening cylinder 2 by the first gear 19 and the fourth gear 23 to rotate, so that the shrimps are discharged through the upper opening of the screening cylinder 2, enter the material guide plate 16, and then discharged through the shrimp discharge port 15. The present disclosure increases the stirring diversity of the stirring rods 6 by arranging the cylindrical cam 7 and the sleeve frame 4, and improves the separation effect of the shrimps and the shells, and also improves the separation effect by spraying water.

In the description of the present disclosure, it should be understood that in addition, the terms "first", "second" and the like are only used for descriptive purpose, and cannot be understood as indicating or implying importance in relativity or implicitly indicating the quantity of the indicated technical features. Therefore, in the description of the present disclosure, unless otherwise specified, "plurality" means two or more. The features defined with "first", "second" and the like may explicitly or implicitly means that one or more of these features are included.

For those skilled in the art, it is obvious that present disclosure is not limited to the details of the above-mentioned exemplary embodiments, and the present disclosure can be implemented in other specific forms without departing from the spirit or basic characteristics of the present disclosure. Therefore, no matter from which point of view, the embodiments should be regarded as exemplary and non-restrictive, the scope of the present disclosure is defined by the appended claims rather than the above-mentioned description, so it is intended that all changes falling within the meaning and scope of equivalent elements of the claims are included in the present disclosure. Any reference signs in the claims should not be regarded as limiting the claims involved.

In addition, it should be understood that although this specification is described in accordance with the embodiments, not each embodiment includes only one independent technical solution, this narration in the specification is only for clarity, and those skilled in the art should regard the specification as a whole, the technical solutions in the various embodiments can also be appropriately combined to form other embodiments that can be understood by those skilled in the art.

What is claimed is:

1. A shrimp shell separation and cleaning device for *Euphausia superba*, comprising: a main body, having an interior provided to be hollow;
   a screening cylinder, installed rotationally inside the main body, and having a bottom installed with a filter screen;
   a stirring assembly, provided rotationally inside the main body,
      wherein the stirring assembly comprises a cylindrical cam installed inside the screening cylinder, a sleeve frame is sleeved over an outer side of the cylindrical cam, a plurality of stirring rods are provided on the sleeve frame in an array mode, the plurality of stirring rods are rotationally installed on the sleeve frame through driving grooves, the driving grooves are provided in such a way that the driving grooves run through the sleeve frame and each have an end, which penetrates through the sleeve frame, rotationally installed in one of the driving grooves on the cylindrical cam, and the sleeve frame is arranged in self-rotating manner;
   a feeding port, installed fixedly on the main body and communicating with the interior of the main body; and
   a spray head, arranged fixedly inside the main body and configured for spraying water into the interior of the screening cylinder.

2. The shrimp shell separation and cleaning device for *Euphausia superba* according to claim 1, wherein the spray head is externally connected with a high-pressure water source.

3. The shrimp shell separation and cleaning device for *Euphausia superba* according to claim 1, wherein an upper end of the screening cylinder is provided with an opening.

4. The shrimp shell separation and cleaning device for *Euphausia superba* according to claim 3, wherein a material guide section is provided at the opening, the screening cylinder is arranged in a self-rotating manner; the interior of the main body is further provided with a material guide plate, and a bottom of the material guide plate is provided with a shrimp discharge port, wherein the shrimp discharge port is installed on a side wall of the main body, and the material guide plate is provided below the bottom of the screening cylinder.

5. The shrimp shell separation and cleaning device for *Euphausia superba* according to claim 1, wherein one end of the cylindrical cam is fixedly installed with a support shaft, and the support shaft is rotationally or fixedly installed on a side wall of the screening cylinder; one end of the sleeve frame away from the support shaft is fixedly installed with a first rotating shaft, wherein the first rotating shaft is provided such that the first rotating shaft penetrates through the side wall of the screening cylinder, and is installed on the main body in a self-rotating manner.

6. The shrimp shell separation and cleaning device for *Euphausia superba* according to claim 1, wherein the main body is further provided with a third motor that is in transmission connection with a first rotating shaft.

7. The shrimp shell separation and cleaning device for *Euphausia superba* according to claim 1, wherein an outer side of one of side walls of the screening cylinder is fixedly installed with a second rotating shaft, and the second rotating shaft is provided such that the second rotating shaft penetrates through a side wall of the main body, the second rotating shaft is rotationally installed on the main body, wherein the second rotating shaft and the first rotating shaft are provided on two sides; and the main body is provided with a first motor that is transmission connection with the second rotating shaft.

8. The shrimp shell separation and cleaning device for *Euphausia superba* according to claim 1, wherein an output end of the first motor is provided with a first gear, and the first gear meshes with a fourth gear fixedly installed on the second rotating shaft.

9. The shrimp shell separation and cleaning device for *Euphausia superba* according to claim 1, wherein a plurality of self-rotating third rotating shafts are provided at the bottom of the screening cylinder, and brushes are provided on the third rotating shafts.

10. The shrimp shell separation and cleaning device for *Euphausia superba* according to claim 1, wherein the main body is further provided with a plurality of second motors that are in transmission connection with a plurality of third rotating shafts.

* * * * *